April 21, 1936. M. MALLORY Re. 19,937
ENGINE IGNITION SYSTEM
Original Filed Dec. 26, 1925
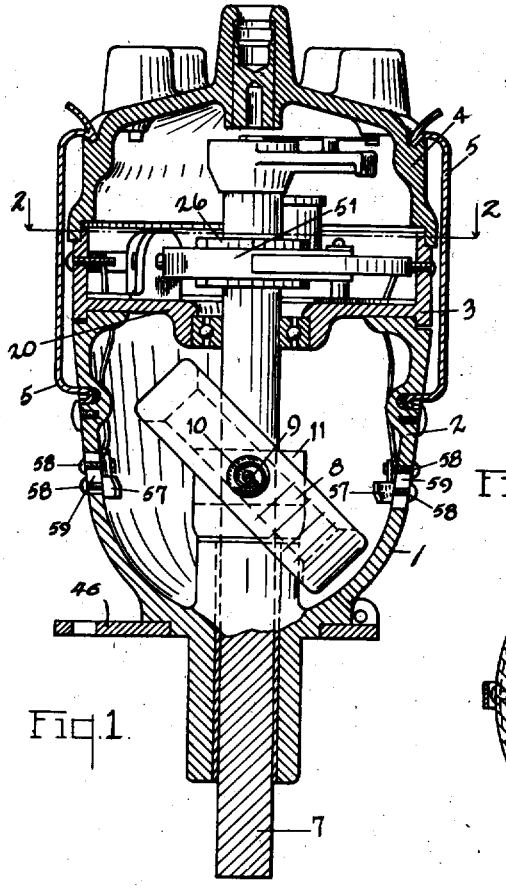
Fig. 1.
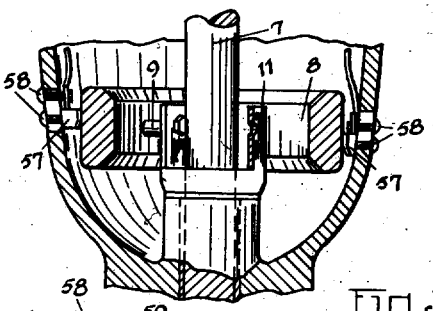
Fig 3.
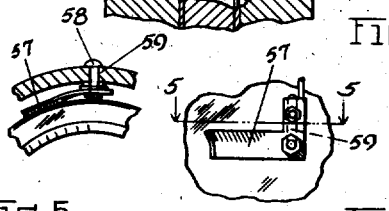
Fig 5.
Fig 4.
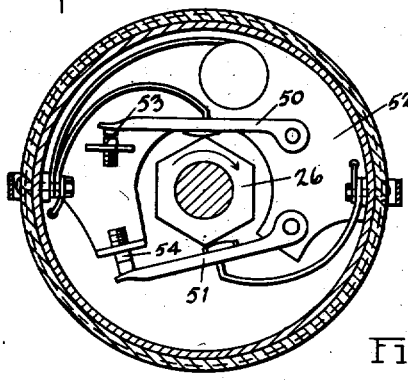
Fig. 2.
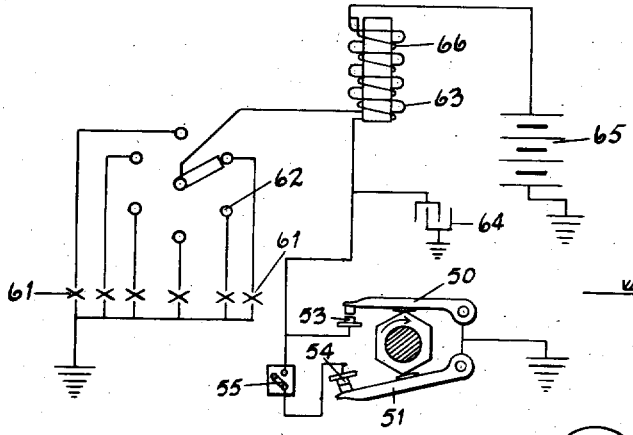
Fig. 7
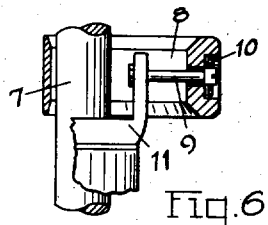
Fig. 6.
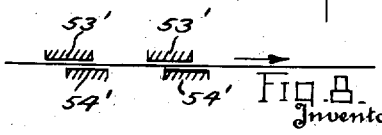
Fig. 8.
Inventor
Marion Mallory
By Frank E. Crampton
Attorney Reissued Apr. 21, 1936 Re. 19,937

UNITED STATES PATENT OFFICE 19,937

ENGINE IGNITION SYSTEM

Marion Mallory, Detroit, Mich., assignor to The Mallory Research Company, a corporation of Delaware Original No. 1,663,207, dated March 20, 1928, Serial No. 77,807, December 26, 1925. Application for reissue October 28, 1935, Serial No. 47,147

3 Claims. (Cl. 123—117)

My invention has for its object to provide an ignition system for internal combustion engines to produce high tension sparks at the spark plugs of the engine at high and low speeds of the engine.

As is well known induction coils have characteristic time constants in which the maximum number of lines of force are produced by the primary coil in conjunction with a given current intensity, and if the circuit breaker of the ignition system opens the primary circuit to produce the spark at the spark plugs before the expiration of the time required for complete building up of the lines of force there is a corresponding reduction of the secondary current. As a result no sparks may be produced when the primary circuit is broken or if produced the sparks have no heat value and may not ignite the gaseous fuel in the cylinders of the engine. When, therefore, the engine and, consequently, the timer of the ignition system is speeded up the periods of closing the circuit is reduced which results in no ignition or poor ignition. When, however, the coils are designed to produce short time constants, the battery losses are correspondingly large. Since the periods allowed for the primary current to rise to its full value in advance of each spark must necessarily come within the period of each cycle of the engine, economy of time for the functioning of ignition system is absolutely imperative. This is particularly true when eight or twelve cylinders are to be ignited from current transformed from the battery current through a single induction coil. Where two coils are used there is invariably a want of synchronism in the ignition of the cylinders of the engine. Also there is a variation of the number of degrees of rotation of the engine shaft, in which a cam operated circuit closer is closed that is dependent on the speed of the engine. The higher the speed the shorter will be the length of the closure period as measured in degrees of rotation of the engine shaft and so that, upon operation of the engine at high speed, the circuit closer will barely strike its fixed contact, due to the bounding effect produced by the cam point striking the circuit closer when running at high speed. This effect in an eight pointed cam used in an eight cylinder engine is double that of a four pointed cam in a four cylinder engine and so that when an eight cylinder engine is running at a comparatively low speed the circuit closer will merely strike its fixed contact.

By my invention high tension sparks of substantially a uniform heat value is produced when the engine is running at high and low speed, and at the same time battery losses are prevented when the engine is running at low speed. A pair of circuit closers are located in the systems involving the use of my invention which may be used to vary or to extend the period of closure of the primary circuit when the speed of the engine has increased sufficiently to make such increase desirable. The period of closure may be adjustably extended. It may be automatically extended according to the speed of the engine or it may be extended by manual operation when the indicated speed reaches a certain point.

The invention may be used in conjunction with ignition systems of different forms and in circuits having different self inductance. To illustrate a practical application of the invention I have shown a system and a timer for controlling the period in which the primary circuit is closed. The system and the timer selected for purposes of illustration are shown in the accompanying drawing and are described hereinafter.

Fig. 1 illustrates a vertical section of a timer that may be used in the application of my invention and which operates to close the circuit of one of the circuit closers. Fig. 2 is a view of a section taken on the plane of the line 2—2 indicated in Fig. 1. Fig. 3 illustrates a position of the governor means when the circuit of the circuit closer which it controls is closed. Fig. 4 is a side view of a contact that is closed by the governor of the timer. Fig. 5 is a view of a section taken on the plane of the line 5—5 indicated in Fig. 4. Fig. 6 illustrates the manner in which the governor of the circuit closer shown in Fig. 1 is counter-balanced, and the means whereby it is supported. Fig. 7 is a view of an ignition system for internal combustion engines wherein the parts are indicated diagrammatically. Fig. 8 indicates diagrammatically the closure periods as measured in the degrees of rotation of the cam shaft of the engine.

The periods of closure of the primary circuit in order to permit the primary current to reach its major or maximum intensity may be controlled manually or automatically. The manual means for controlling one or both of the circuit closers may be performed in different ways and also automatic means of various forms may be used for automatically controlling the circuit closers to extend the periods. In the form of construction shown in the drawing an automatic means is provided and a manual means are provided whereby the control may be made either automatically or manually, the first according to the speed of the engine, and the second may be manually operated when it is found desirable to increase the length of period of closure of the primary circuit in order to give the primary current opportunity to rise to near its maximum, that is, to produce efficient sparking conditions.

In the form of construction shown the ignition timer is provided with a shell 1 having a plurality of sections 2, 3, and 4 that may be secured together by spring clips 5. A spindle 7 of the type commonly used in such timers is provided with suitable bearings and is rotated by suitable mechanism through which it is connected to the crank shaft of the engine. It has a governor ring 8 which is rotatably supported on pins 9 and is elastically held normally in a plane that is located at an acute angle with the axis of the shaft 7. As the shaft 7 increases in speed, the plane of the ring 8 approximates a position such that it will be at right angles to the axis of the shaft 7 notwithstanding the counter-balancing effect of the spring 10 which has one end connected to one of the pins and the other end connected to the ring. The pins 9 are connected to a suitable sleeve 11 which is secured to the shaft 7 and consequently the ring is rotated about the axis of the shaft 7.

The circuit closers are so located that one is opened by a cam point in advance of the other, either by the same cam point or by another of the cam points. In the form shown, one circuit closer is operated by one cam point while the other is operated by another of the cam points. The cam engaging points on the circuit closers may be located substantially in any of the radii of the circle of rotation of the cam shaft that are at an angle to each other that is equal to 360 degrees divided by the number of cylinders or any multiple thereof, one circuit closer, however, being located a short distance off of this angle so that one or the other of the circuit closers is first opened a desired length of time as measured in the degrees of rotation of the cam shaft after the other circuit closer is opened and before said other is closed, whereby the closed period for the primary circuit in which the circuit closers are connected in parallel relation to each other, is extended provided the circuits of both circuit closers are completed. Thus the closing of the circuit closer 51 is in advance of the opening of the circuit closer 50. Also the opening of the circuit closer 51 is in advance of the closing of the circuit closer 50. This is indicated in Fig. 8, where the period of closure is indicated by the cross hatched parts 53' and 54' that correspond to the closure times of the contacts 53 and 54, which, however, is slightly reduced on increase of speed due to the bounding effect produced by the cam points striking the circuit closers with an increased force. It is thus apparent that the two circuit breakers are in parallel relation to each other and have overlapping closure periods with one (51) breaking later than the other (50) but before the other (50) closes. The control of the primary circuit may be operated manually by the operation of such a switch as shown diagrammatically in Fig. 7, or it may be performed automatically when the speed of the engine increases to a predetermined point. The point of closure of the parallel circuit in which the circuit closer 51 is located, may be adjusted, if desired. Also the times of closure relative to the axis of the spindle 7 may be adjusted. If it is desired to advance or retard the periods relative to the rotation of the cam shift, it may be done by rotating the shell 1. The shell 1 may be provided with an arm 46 that may be connected by a suitable wire to the instrument board of the automobile for manual operation.

The circuit of the circuit closer 51 is closed by the governor ring 8 when, due to the rotation of the shaft 7, it is turned to a certain angular position relative to the axis of the shaft. A pair of contacts 57 is adjustably secured, in their relative positions, to the wall of the section 2 of the shell 1. The contacts 57 project into the shell so as to make contact with the ring 8 when it is tilted to a certain point and consequently the circuit through the circuit closer 51 may be completed and thus the closure period relative to the degree of rotation of the cam shaft will be increased according to the advance in degree of the opening time of the circuit closer 51 relative to the cam 26. Each contact 57 may be formed of an elastic sheet metal L-shaped piece that may be secured in position by means of the bolts 58 which extend through the slots 59 that are formed in the wall of the section 2 of the shell. The contacts 57 are so formed as to extend arcuately in the shell with respect to the axis of rotation of the ring 8 and are bowed so as to readily receive the edge of the ring 8 as it is tilted and at the same time rotated.

In the system shown diagrammatically in Fig. 7 the spark plugs 61 are connected to the distributor 62 and the arm of the distributor is connected to the secondary 63 of the induction coil and the secondary 63 is connected to the ground through the battery 65. The primary circuit that leads from the battery 65, extends through a primary coil 66 of the induction coil and through the circuit closers 50 and 51 to the ground. The circuit closers 50 and 51 are connected in the primary circuit and consequently the primary circuit may be closed through either branch of the circuit in which one of the closers is located. The primary coil 66 is connected to the fixed contacts 53 and 54, the switch 55 being located in the circuit of the circuit closer 51.

I claim:

1. In an ignition timing device, an ignition circuit including a single induction coil, and two circuit breakers connected in parallel in the primary of said coil and having overlapping closure periods with one breaking later than the other but before the other again closes, and a cam for operating the circuit breakers.

2. In an ignition timing device, an ignition circuit including a single induction coil, two circuit breakers connected in parallel in the primary of said coil and having overlapping closure periods with one breaking later than the other but before the other again closes, a cam for operating the circuit breakers, and a switch located in circuit with one of said circuit breakers.

3. In an ignition timing device, an ignition circuit including a single induction coil, two circuit breakers connected in parallel in the primary of said coil and having overlapping closure periods with one breaking later than the other but before the other again closes, a cam for operating the circuit breakers, a switch located in circuit with one of said circuit breakers, and means for automatically opening and closing said switch according to the speed of the engine.

MARION MALLORY.